US011511706B2

(12) United States Patent
Ahn

(10) Patent No.: US 11,511,706 B2
(45) Date of Patent: Nov. 29, 2022

(54) WASHING SYSTEM WITH PREVENTION OF WASHER FLUID FREEZING

(71) Applicants: Hyundai Motor Company, Seoul (KR); Kia Motors Corporation, Seoul (KR)

(72) Inventor: Byoung-Suk Ahn, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 543 days.

(21) Appl. No.: 16/155,194

(22) Filed: Oct. 9, 2018

(65) Prior Publication Data
US 2019/0176767 A1 Jun. 13, 2019

(30) Foreign Application Priority Data
Dec. 8, 2017 (KR) .......................... 10-2017-0168385

(51) Int. Cl.
B60S 1/48 (2006.01)
B60S 1/08 (2006.01)
H05B 1/02 (2006.01)

(52) U.S. Cl.
CPC ................ B60S 1/487 (2013.01); B60S 1/08 (2013.01); B60S 1/481 (2013.01); B60S 1/488 (2013.01); H05B 1/0236 (2013.01); H05B 1/0297 (2013.01); H05B 2203/02 (2013.01)

(58) Field of Classification Search
CPC ...... B60S 1/08; B60S 1/46; B60S 1/48; B60S 1/481; B60S 1/485; B60S 1/486; B60S 1/487; B60S 1/522; B60S 1/524; B60S 1/488; H05B 1/0236; H05B 1/0297; H05B 2203/02

USPC .............. 15/250.05, 250.06, 250.01, 250.04; 239/284.1, 284.2
See application file for complete search history.

(56) References Cited

U.S. PATENT DOCUMENTS

| | | | | |
|---|---|---|---|---|
| 2,576,198 A * | 11/1951 | Stuart | ..................... | B60S 1/487 239/126 |
| 3,516,610 A * | 6/1970 | Stevens | ..................... | B60S 1/48 239/284.1 |
| 4,877,186 A * | 10/1989 | Scholl | ..................... | B60S 1/481 239/75 |
| 5,383,247 A * | 1/1995 | Nickel | ..................... | B60S 1/488 15/250.01 |
| 5,857,624 A * | 1/1999 | Lee | ......................... | B05B 1/3006 239/284.1 |
| 2008/0034528 A1* | 2/2008 | Bourke | ................. | B60S 1/3805 15/250.06 |

FOREIGN PATENT DOCUMENTS

| | | |
|---|---|---|
| GB | 1576098 | * 10/1980 |
| KR | 10-1998-0027275 A | 7/1998 |
| KR | 10-2001-0019517 A | 3/2001 |
| KR | 20-0235575 Y1 | 9/2001 |
| KR | 10-2012-0015801 A | 2/2012 |
| KR | 2012-0035567 A | 4/2012 |

* cited by examiner

Primary Examiner — Gary K. Graham
(74) Attorney, Agent, or Firm — Fox Rothschild LLP

(57) ABSTRACT

A method of preventing washer fluid freezing is provided. The method includes performing hose residual washer fluid removal control that removes residual washer fluid of a hose which is a movement path of washer fluid after a spray of the washer fluid by operation of a pump washer fluid device.

6 Claims, 8 Drawing Sheets

WASHING SYSTEM WITH PREVENTION OF WASHER FLUID FREEZING

CROSS-REFERENCE(S) TO RELATED APPLICATIONS

This application claims priority to Korean Patent Application No. 10-2017-0168385, filed on Dec. 8, 2017, which is incorporated herein by reference in its entirety.

BACKGROUND

Field of the Disclosure

The present disclosure relates to washer fluid freezing prevention, and more particularly, to a washing system that prevents spray fault due to washer fluid freezing in a cold temperature environment.

Description of Related Art

Generally, a washing system for a vehicle should stably maintain washer fluid to provide a driver with front/rear vision even in a cold temperature environment. For this purpose, the washing system includes a wiper device, a washer device, and a heat-generation device. The wiper device includes of a wiper that wipes a window glass by a motor operating during operation.

For example, the wiper device wipes the window glass with the wiper that operates with the motor during operation to remove foreign substances. The washer device performs the washing that sprays washer fluid in a reservoir on the window glass, through which a wiper blade passes, from a nozzle via a hose by a washer pump, thus enhancing foreign substances removal performance of the wiper.

The heat-generation device links positive temperature coefficient (PTC) heating by a battery current during operation with the reservoir, the hose, and the nozzle to prevent washer fluid freezing in a low-temperature state, and also with the wiper and the window glass to perform hot-wiring of the wiper blade and the window glass. Thus, the washing system increases the temperatures of the washer fluid, the wiper blade, and the window glass by the PTC heat-generation, thus maintaining smooth operation even in a cold temperature environment, and particularly, preventing the washer fluid spray failure due to the washer fluid freezing in a low-temperature state.

However, the washing system of the related art has the disadvantages of insufficient allocation of energy efficient heat-generation function together with structural high cost. For example, the high-cost aspect is caused by the hot-wiring of the wiper and the window glass while the PTC element is used for the heating of a reservoir, a hose, and a nozzle. The aspect of the insufficient allocation of the heat-generation function is caused by the facts that firstly, when the temperature increases during the constant heat-generation of the PTC element, the heat is unable to be generated more than a particular temperature due to the increment in the resistance; secondly, after nozzle freezing is confirmed, the nozzle is unable to be thawed due to delay of a thawing time and a start-up OFF condition of the vehicle; and thirdly, delay of the increment in heat-generation temperature that degrades the responsiveness occurs even when power consumption increases.

The contents described in this section are to aid the understanding of the background of the present disclosure, and may include what is not previously known to those skilled in the art to which the present disclosure pertains.

SUMMARY

Accordingly, the object of the present disclosure is to provide a method of preventing washer fluid freezing and a washing system capable of performing recovery of the washer fluid within the washer fluid path after the washing, thus minimizing the use of power consumption, and particularly, linking operation of the washer pump with engine OFF and external air temperature, thus performing more stable washing operation without spray failure due to washer fluid freezing in a cold temperature environment that is the low-temperature washer fluid freezing condition.

A method of preventing washer fluid freezing in accordance with the present disclosure may include performing, by a washing controller, hose residual washer fluid removal control to remove the residual washer fluid of a hose that is the movement path of the washer fluid after the washer fluid spray by operation of a pump washer fluid device. The residual washer fluid may be removed regardless of freezing temperature of external air temperature.

Additionally, the hose residual washer fluid removal control may be divided into freezing-response washing control and preemptive freezing-response washing control based upon the freezing temperature of the external air temperature after engine start-up. The freezing-response washing control is performed when the temperature of the external air is equal to or greater than a freezing temperature, and the preemptive freezing-response washing control is performed when the temperature of the external air is less than the freezing temperature.

Particularly, the freezing-response washing control may include determining the necessity of conversion for the movement path of the washer fluid of the hose, spraying the washer fluid to a nozzle by spray operation of a washer pump, and recovering the residual washer fluid to a reservoir by recovery operation of the washer pump on engine start-up OFF. When a flow amount control valve is installed to the hose, the necessity of conversion is not determined, while when an opening/closing valve operated by a valve motor is installed thereto, the necessity of conversion is determined.

Further, the preemptive freezing-response washing control may include determining whether the washer fluid freezing temperature is less than the freezing temperature of the external air temperature, determining the necessity of conversion for the movement path of the washer fluid of the hose at the washer fluid freezing temperature, spraying the washer fluid to the nozzle in the spray operation of the washer pump, again determining whether the washer fluid freezing temperature is less than the freezing temperature of the external air temperature on engine start-up OFF, and recovering the residual washer fluid to the reservoir in the recovery operation of the washer pump at the washer fluid freezing temperature. When the flow amount control valve is mounted to the hose, the necessity of conversion is not determined, while when the opening/closing valve operated by a valve motor is installed thereto, the necessity of conversion is determined.

Moreover, a washing system in accordance with the present disclosure for achieving the object may include a pump washer fluid device having a washing path converter installed to a hose that connects from a reservoir to a nozzle to form a movement path of the washer fluid as a spray path by the nozzle and a recovery path by the reservoir; and a washing controller configured to form the spray path or the recovery path by an operation of a washer pump.

The washer pump forms the spray path and the recovery path by bi-directional rotation, respectively. Furthermore, the washer pump may be divided into a spray pump and a recovery pump of one-directional rotation, and the rotation of the spray pump forms the spray path, and the rotation of the recovery pump forms the recovery path, respectively. The spray pump may be installed to a spray hose that connects from the reservoir to the nozzle, and the recovery pump may be branched from the spray hose to be installed to the recovery hose connected to the reservoir.

Additionally, the washing path converter is a flow amount control valve that forms the spray path and the recovery path, respectively. The flow amount control valve may include a spray chamber connected to the spray path by a plunger moving to the nozzle with washer fluid pressure by spray pumping of the washer pump, and a recovery chamber connected to the recovery path by the plunger moving to the reservoir with washer fluid suction force by the recovery pumping of the washer pump.

The washing path converter may include an opening/closing valve and a valve motor to form the spray path and the recovery path, respectively. The opening/closing valve may be operated by the valve motor to convert the movement path of the washer fluid into the spray path and the recovery path, and the valve motor may be operated by the washing controller.

Further, the washing path converter may include a spray opening/closing valve disposed to a spray hose of the hose that connects from the reservoir to the nozzle to form the spray path, a recovery opening/closing valve provided to the recovery hose branched from the spray hose and connected to the reservoir to form the recovery path, and a valve motor configured to operate each of the spray opening/closing valve and the recovery opening/closing valve. The spray opening/closing valve may be operated by the valve motor to convert the movement path of the washer fluid into the spray path using the spray hose, the recovery opening/closing valve may be operated by the valve motor to convert the movement path of the washer fluid into the recovery path using the recovery hose, and the valve motor may be operated by the washing controller.

In particular, the washing controller may be connected with a washing control map provided with a table map that matches engine start-up ON/OFF signals and external air temperature of an external air temperature sensor with operation of the washing path converter. The pump washer fluid device may include a wiper device and a heating device, the wiper device may include a wiper, a wiper motor, and a wiper controller, and the heating device may include a window glass heater, a wiper blade heater, and a washer fluid heater.

The washer fluid freezing prevention control applied to the washing system in accordance with the present disclosure implements the following functions and effects. Firstly, a more stable washing operation may be performed in a cold temperature environment that is the washer fluid freezing condition at a low temperature by removing the washer fluid within the washer fluid path of the washer pump linked with engine OFF. Secondly, weight savings together with cost savings are implemented by the minimized hot-wiring of the reservoir, the hose, the nozzle, the wiper, and the window glass. Thirdly, the washing responsiveness during operation of the heating hose may be improved from a minimum of 25% to a maximum of 250% by the recovery and filling of the washer fluid through temperature sensing and control compared to the conventional techniques. Fourthly, by performing the pumping operation control of the washer pump to reduce heating power consumption, it may be possible to reduce power consumption compared to the conventional techniques. Fifthly, by changing the pumping operation control of the washer pump based on the external air temperature, it may be possible to prevent the unnecessary recovery of the washer fluid even in engine OFF at greater than the freezing temperature.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present disclosure are described with reference to the accompanying drawings, and since the exemplary embodiments may be implemented in various different forms by way of example by those skilled in the art, so are not limited to the exemplary embodiments described herein.

Figure 1:
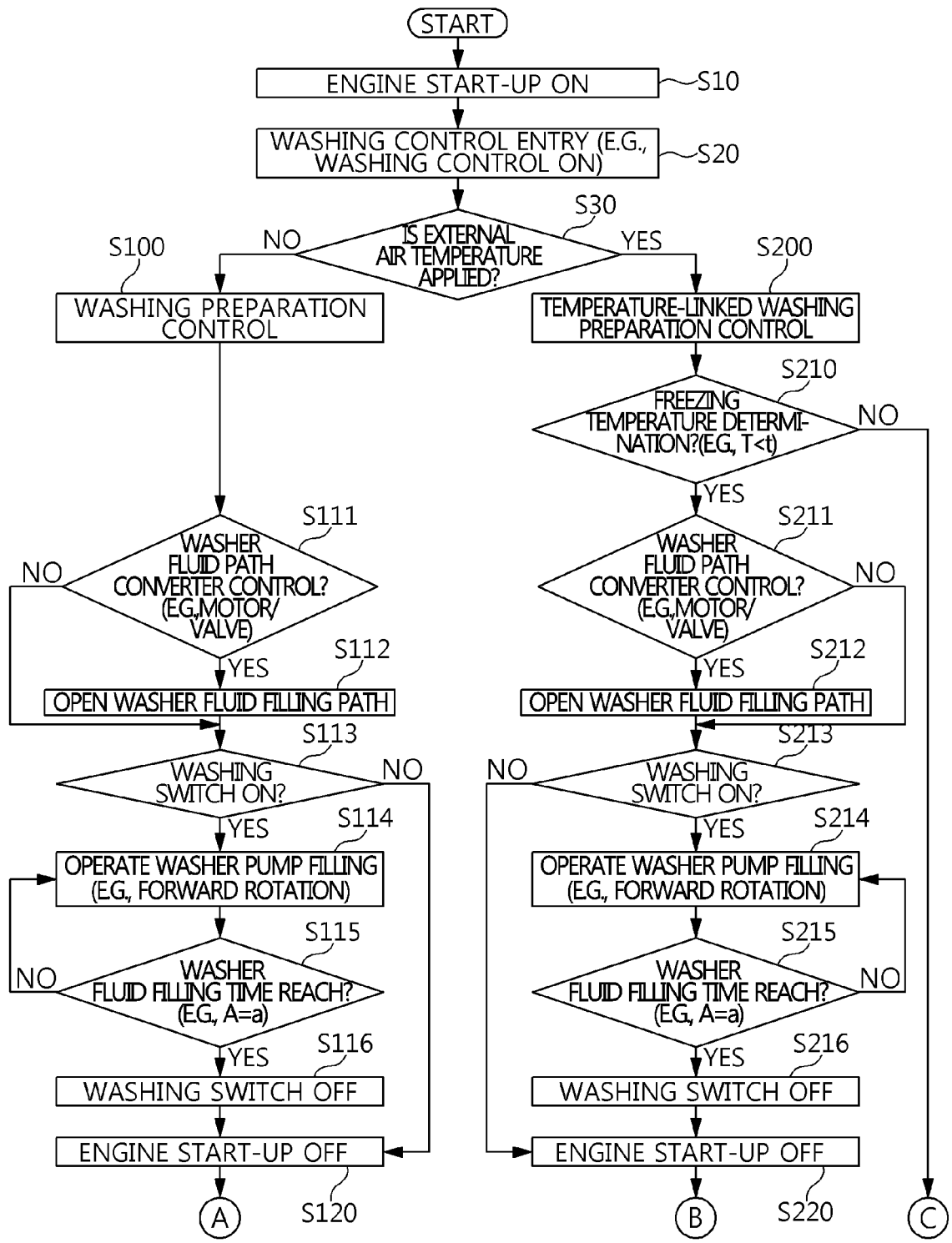
FIGS. 1 and 2 are flowcharts of a method of preventing washer fluid freezing in accordance with an exemplary embodiment of the present disclosure.
Figure 2:
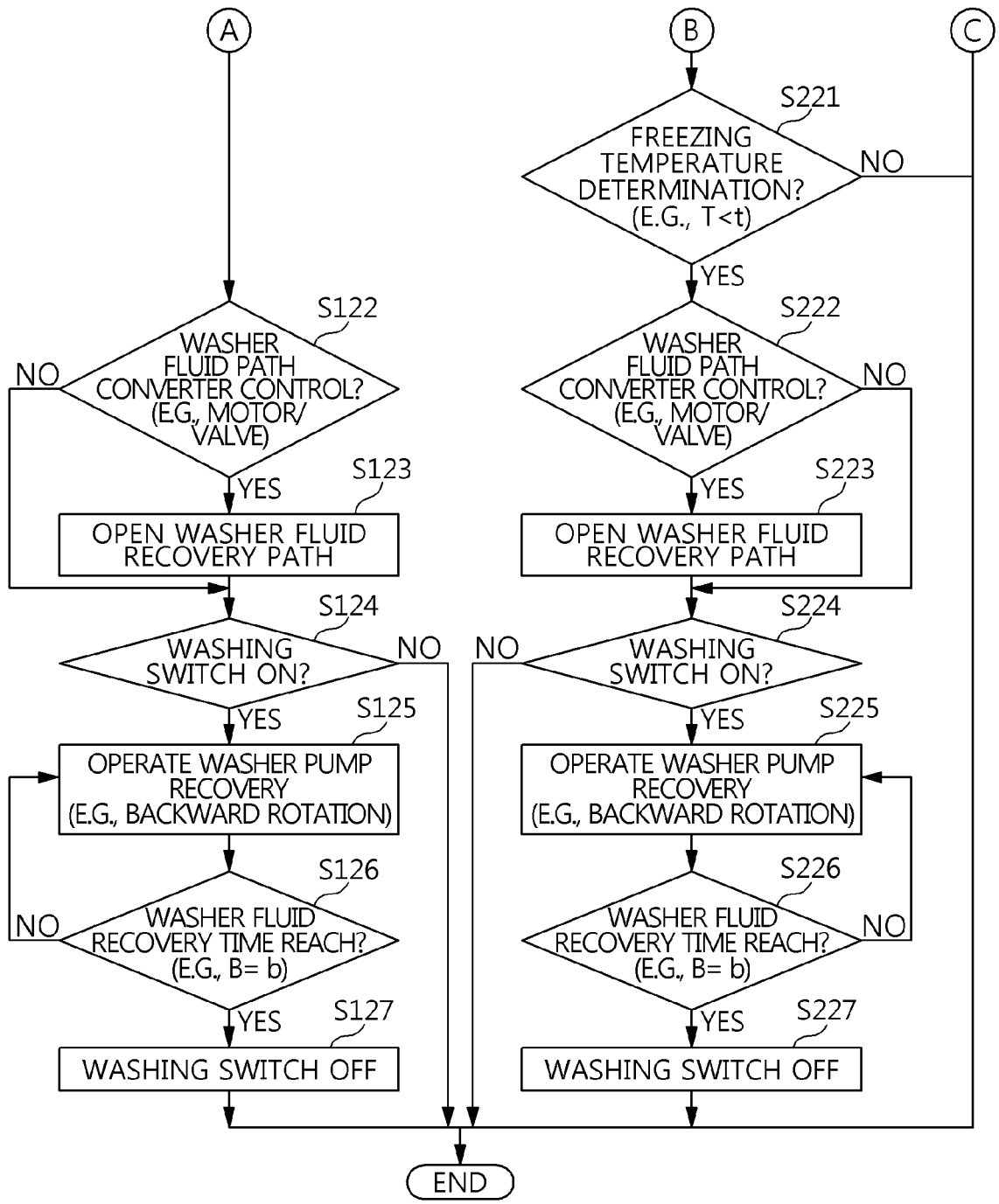

Referring to FIGS. 1 and 2, a method of preventing washer fluid freezing performs a hose residual washer fluid removal control, the hose residual washer fluid removal control includes a freezing-response washing control S100-S127 with a washer pump recovery operation based upon engine start-up OFF S120 after the filling operation of the washer pump based upon engine start-up ON S10 through a washing preparation control S100, or a preemptive freezing-response washing control S200-S227 with a washer pump recovery operation based upon external air temperature determination on engine start-up OFF S220 after the filling operation of the washer pump based upon the external air temperature determination on engine start-up ON S10 through a temperature-linked washing preparation control S200, thus recovering washer fluid that may be frozen in a low-temperature condition.

As a result, the washer fluid freezing prevention control resolves the disadvantages of a high-cost structure of the PTC-applied heat-generation method and insufficient allocation of the energy efficient heat-generation function since there is minimal power consumption caused by heat-generation of a heater for resolving the washer fluid freezing, and greatly improves performance of the washing system for obtaining front visibility in a cold temperature environment by a continuously more stable washer fluid spray.

Figure 3:
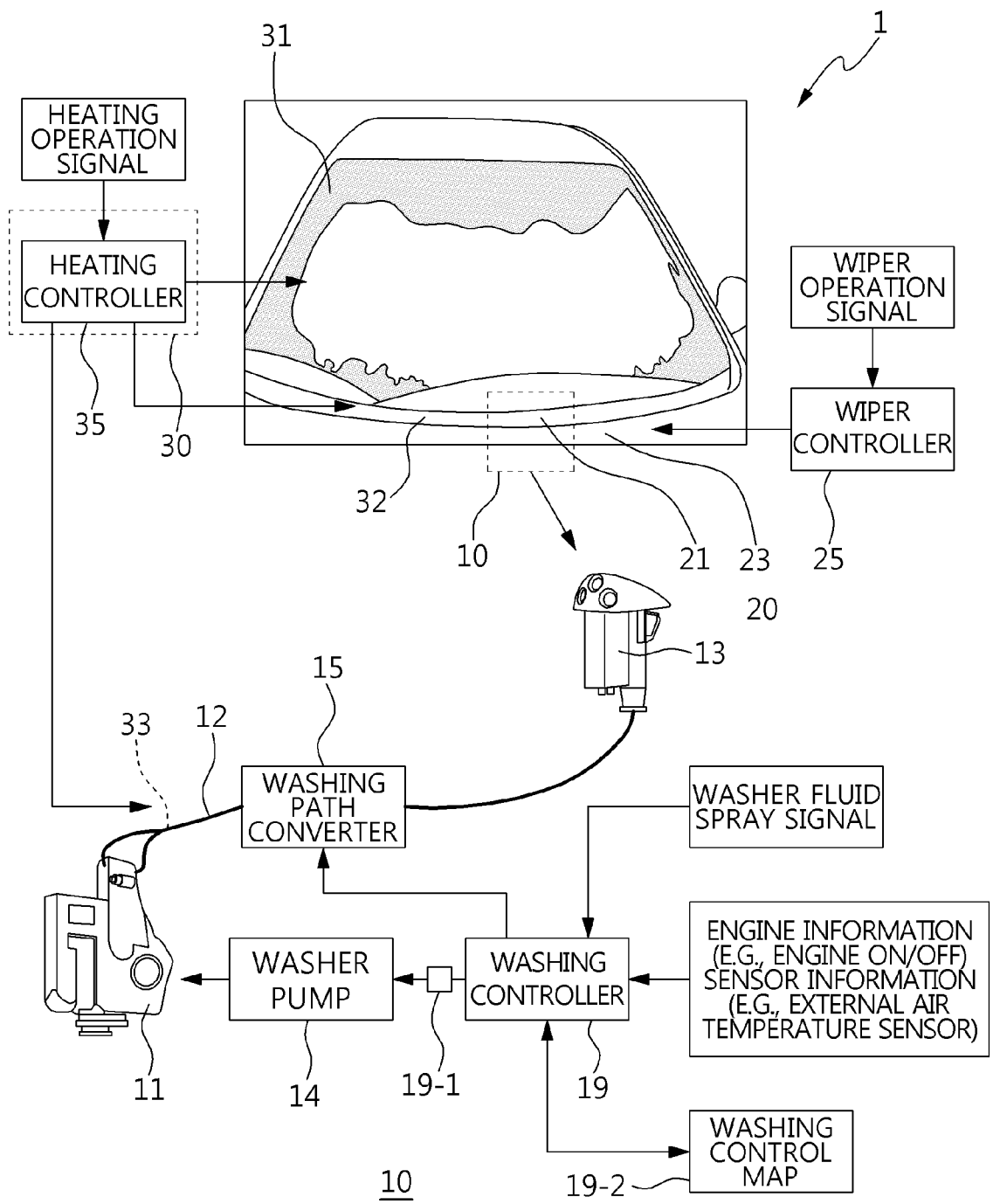
FIG. 3 is an example of a washing system performing the washer fluid freezing prevention control in accordance with an exemplary embodiment of the present disclosure.
Figure 4A:
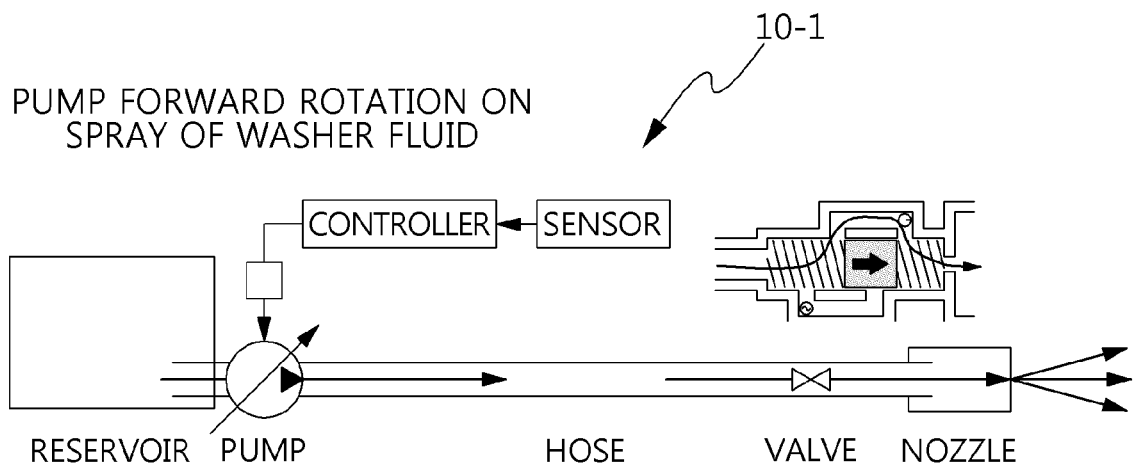
FIGS. 4A-4B are operation states of a valve type single pump washer fluid device in accordance with an exemplary embodiment of the present disclosure.
Figure 4B:
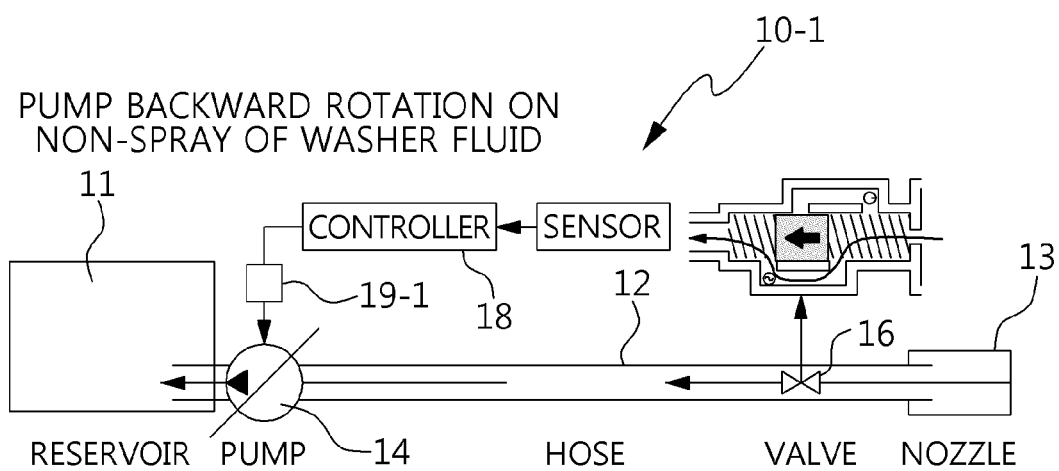

Referring to FIGS. 3 and 4A-4B, a washing system 1 may include a pump washer fluid device 10, a wiper device 20, and a heating device 30. In FIG. 3, the pump washer fluid device 10 may include a reservoir 11, a hose 12, a nozzle 13, a washer pump 14, a washing path converter 15, and a washing controller 19.

In particular, the reservoir 11 may store washer fluid. The hose 12, as a washer fluid path, may have a second end connected with the nozzle 13 when a first end thereof is connected to the reservoir 11. The nozzle 13 may be configured to spray the washer fluid coming from the hose 12 onto a window glass installed with a window glass heater 31 of the heating device 30. The washer pump 14 may be configured to pump the washer fluid of the reservoir 11 to transmit the washer fluid to the hose 12. Accordingly, the reservoir 11, the hose 12, the nozzle 13, and the washer pump 14 are the same as the components of general pump washer fluid device.

Figure 5:
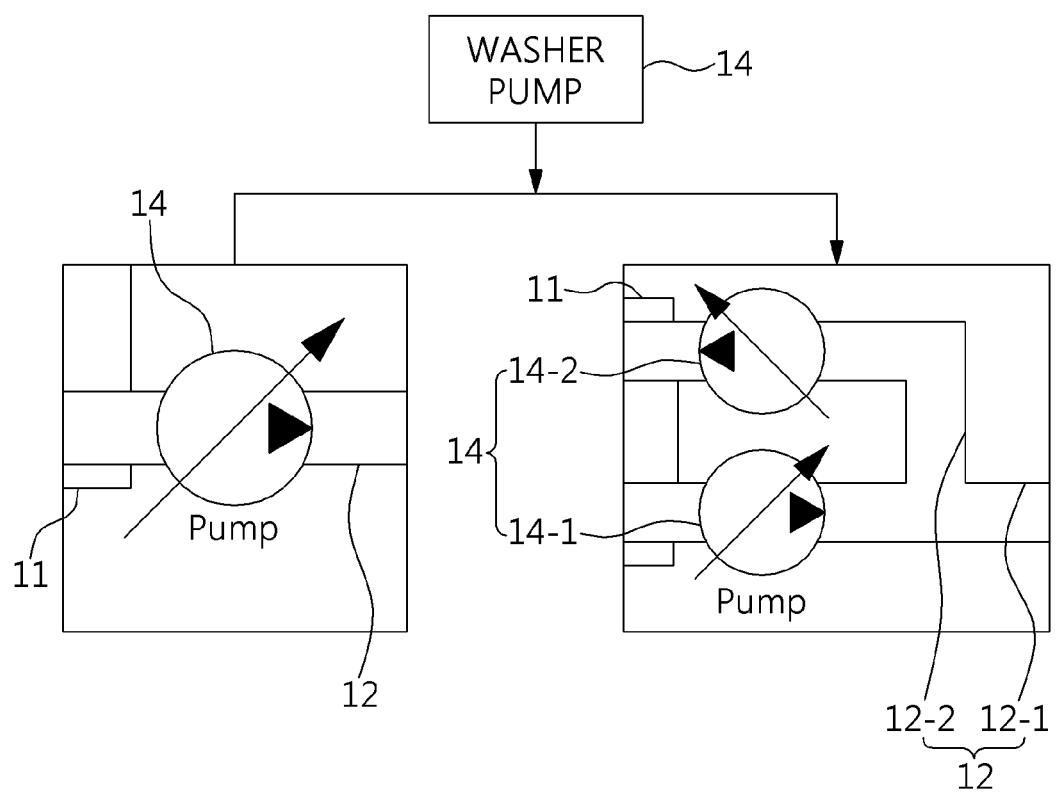
FIG. 5 is a configuration example of a washer pump for the pump washer fluid device of the washing system in accordance with an exemplary embodiment of the present disclosure.

Further, the washing path converter 15 may be mounted to the hose 12 to recover the washer fluid within the hose 12 to the reservoir 11, or to form dual paths to the nozzle 13. Particularly, the washing path converter 15 is applied with a flow amount control valve 16 configured to perform mechanically independent operation, as illustrated in FIG. 5. For this purpose, the flow amount control valve 16 may include a valve housing 16a, a dual chamber 16b, 16c, a plunger 16e, and an elastic member 16f. The valve housing 16a forms a washer fluid path 16a-1 of a bi-directional opening structure by an inner wall 16d, and forms the movement path of the washer fluid connected with the hose 12 through the washer fluid path 16a-1. The washing path converter 15 may include an opening/closing valve 17 operated by a valve motor 18 as illustrated in another exemplary embodiment in FIG. 5.

The washing controller 19 may be configured to adjust the washer fluid spray by operating the pump washer fluid device 10 using a washer fluid spray signal, and may be configured to prevent the washer fluid from remaining in the hose 12 after stopping the operation of the pump washer fluid device 10 by recovering or spraying the washer fluid inside the hose 12 based upon the engine information of engine ON/OFF and the sensor information of an external air temperature sensor. Accordingly, the washing controller 19 may include a washing switch 19-1 and a washing control map 19-2. The washing switch 19-1 electrically connects the washing controller 19 with the washer pump 14 to perform ON/OFF of the washer pump 14. The washing control map 19-2 may include ON/OFF signals of engine (engine information) read from the washing controller 19, and a table map that matches the detected temperature of the external air temperature sensor (sensor information) with the washing path converter 15.

In particular, the wiper device 20 may include a wiper 21, a wiper motor 23, and a wiper controller 25. The wiper 21 removes foreign substances of the window glass to which the window glass heater 31 of the heating device 30 is installed. The wiper motor 23 may be configured to operate the wiper 21 by a control of the wiper controller 25. In other words, the wiper controller 25 may be configured to output a control signal to operate the wiper motor 23 by a driver operation. Accordingly, the wiper 21, the wiper motor 23, and the wiper controller 25 are the same as the components of general wiper device.

The heating device 30 may be divided into the window glass heater 31, a wiper blade heater 32, and a washer fluid heater 33 that turn ON and OFF by a heating controller 35 connecting a battery power source. The window glass heater 31 may be disposed at a bottom layer of the window glass to heat the window glass. The wiper blade heater 32 may be disposed at a bottom layer under the blade of the wiper 21 to heat a rubber of the blade. The washer fluid heater 33 may be disposed under the reservoir 11, the hose 12, and the nozzle 13, or under any one thereof to heat the washer fluid below freezing point.

Accordingly, the window glass heater 31, the wiper blade heater 32, the washer fluid heater 33, and the heating controller 35 are the same as the components of general heating device. However, the heating device 30 is linked with the pump washer fluid device 10 including the washing path converter 15 and the washing controller 19, thus implementing the following advantages compared to the conventional heating device.

The heating device 30 may be linked with the pump washer fluid device 10 to implement, firstly, the same performance with a reduced length of the heater to save costs and weight compared to the conventional technique; secondly, the enhancement of the responsiveness to operation of the heating hose of the washer fluid heater 33 by the recovery and filling of the external air temperature sensing and control; and thirdly, the reduction in the power consumption by reducing the power consumed for heating compared to the conventional technique.

Referring to FIGS. 4A-4B, examples are illustrated where the pump washer fluid device 10 includes a valve type dual pump washer fluid device 10-1. The valve type dual pump washer fluid device 10-1 may include a bi-directional rotation (e.g., normal/inverse rotations) type washer pump 14 and a mechanic type flow amount control valve 16 to the hose 12 that connects the reservoir 11 and the nozzle 13.

Accordingly, the washing controller 19 may be configured to adjust the bi-directional rotation (e.g., normal/inverse rotations) of the washer pump 14 via the washing switch 19-1 to form the washer fluid spray flow for the nozzle 13 of the hose 12 and the residual washer fluid recovery flow for the reservoir 11.

Hereinafter, the method of preventing the washer fluid freezing will be described with reference to FIGS. 3 and 4A-4B. In particular, the control body is the washing controller 19 linked with the washing control map 19-2 of the pump washer fluid device 10, and the control object is the washer pump 14. The washing controller 19 may enter the washing control S20 on the engine start-up ON detection S10, and then may be configured to determine whether the external air temperature is applied (S30).

Referring to FIG. 3, the washing controller 19 regards the engine start-up ON/OFF as engine information to recognize engine ON by Key On, and simultaneously reads the detected value of the external air temperature of the external air temperature sensor to confirm the sensor information. As a result, the washing controller 19 may be configured to convert into a freezing-response washing control S100-S127 when the detected external air temperature is equal to or greater than the freezing temperature. When the detected external temperature is less than the freezing temperature, the washing controller 19 may be configured to convert into a preemptive freezing-response washing control S200-S227.

The washing controller 19 may be configured to execute the freezing-response washing control S100-S127, and the freezing-response washing control S100-S127 may be divided as the washing preparation control S100, determining washing path converter spray control S111-S112, operating washing switch spray S113-S117, detecting engine start-up OFF S120, executing washing path converter recovery S122-S123, and operating washing switch recovery S124-S127.

In particular, the determining of the washing path converter spray control S111-S112 may include operating the washing path converter S111 followed by opening the washer fluid filling path of the hose 12 S112. Accordingly, the determining of the washing path converter spray control S111-S112, as illustrated in FIGS. 4A-4B, may not be applied when the washing path converter 15 of the hose 12 is the mechanic type flow amount control valve 16, and as illustrated in FIGS. 7A-7B and 8A-8B, it may be applied to an electric type washing path converter 15 including the opening/closing valve 17 and the valve motor 18 or a spray opening/closing valve 17-1, a recovery opening/closing valve 17-2, and the valve motor 18.

The operating of the washing switch spray S113-S117 may be performed by detecting washing switch spray ON S113, operating washer pump filling S114, confirming washer fluid filling time reach S115, and detecting washing switch spray OFF S116. Particularly, the washer fluid filling time reach may be obtained by the following equation 1. The determining of the washer fluid filling time reach may be caused by the length difference of the hose 12 based upon a type of the vehicle.

$$\text{washer fluid filling time reach: } A=a \qquad \text{Equation 1}$$

wherein, "A" refers to a spray movement time when the washer fluid moves the hose 12 until the washer fluid is sprayed to the nozzle 13 from the reservoir 11, and "a" to the setting value that is set by the length of the hose 12, so is not limited to a specific value. As a result, OFF operation of the washing switch may be based upon the confirmation of the washer fluid spray of the nozzle 13 after the washer fluid filling time reach.

The detecting of the engine start-up OFF S120 may be performed by the recognition of Key Off, and indicates engine stop. The execution of the washing path converter recovery S122-S123 is the same as the determining of the washing path converter spray control S111-S112. The operating of the washing switch recovery S124-S127 may be performed by recognizing detecting switch recovery ON S124, operating washer pump recovery S125, confirming washer fluid recovery time reach S126, and detecting washing switch recovery OFF S127. Particularly, the washer fluid recovery time reach may be determined by the following equation 2. The determining of the washer fluid recovery time reach is the same as the reason for the determining of the washer fluid spray time reach.

$$\text{washer fluid recovery time reach: } B=b \qquad \text{Equation 2}$$

wherein, "B" refers to a return movement time that the washer fluid moves from the nozzle 13 to the hose 12 to return to the reservoir 11, "b" to the setting value that is set by the length of the hose 12, so is not limited to a specific value. As a result, OFF operation of the washing switch may be based upon the confirmation of the washer fluid spray of the nozzle 13 after the washer fluid filling time reach.

Referring to FIG. 3, the washing controller 19 may be configured to perform the normal rotation of the washer pump 14 by an ON signal of the washer fluid spray signal to pump the washer fluid, while it stops the operation of the washer pump 14 by an OFF signal of the washer fluid spray signal. Referring to FIGS. 4A-4B, the normal rotation (e.g., forward rotation) of the washer pump 14 transfers the washer fluid of the reservoir 11 to the hose 12, and the flow amount control valve 16 mounted to the hose 12 may be configured to discharge the washer fluid into a spray chamber 16b instead of a recovery chamber 16c closed by the movement of the plunger 16e based upon the washer fluid pressure to be sprayed through the nozzle 13. Additionally, the reverse rotation (or backward rotation) of the washer pump 14 suctions the washer fluid of the hose 12, and the suction force of the washer fluid pulls the plunger 16e of the flow amount control valve 16 to close the opened spray chamber 16b instead of opening the closed recovery chamber 16c. As a result, all of the washer fluid not sprayed from the nozzle 13 returns to the reservoir 11 via the hose 12 through the recovery chamber 16c.

Accordingly, even when the pump washer fluid device 10 of the washing system 1 operates under an external air condition that is equal to or greater than the freezing temperature and then the vehicle is left under the external air condition that is less than the freezing temperature, the washer fluid freezing phenomenon may be prevented since no washer fluid remains in the hose 12.

Furthermore, the washing controller 19 may further be configured to determine freezing temperature S210 and S221 when the preemptive freezing-response washing control S200-S227 is performed. The determining of the freezing temperature S210, S221 applies the following equation 3.

$$\text{Freezing temperature determination: } T<t \qquad \text{Equation 3}$$

wherein, "T" refers to the value of an external air temperature detected at the determination point, as the external air temperature, and "t" to the setting value of the freezing temperature and is differently set based upon the type of washer fluid, so is not limited to a specific value.

As a result, when the external air temperature detected at the determination point is equal to or greater than the setting value of the freezing temperature, the freezing-response washing control S100-S127 may be performed, and the preemptive freezing-response washing control S200-S227 may be terminated. When the detected external air temperature is less than the setting value of the freezing temperature, the freezing-response washing control S100-S127 may be performed instead.

Accordingly, the difference between the preemptive freezing-response washing control S200-S227 and the freezing-response washing control S100-S127 is as follows. The temperature-linked washing preparation control S200 has only difference in the name, and the same meaning as that of the washing preparation control S100. The determining of the freezing temperature S210 may be performed before the determining of the washing path converter spray control S211-S212 to differ from the manner that the freezing-response washing control S100-S127 immediately enters into the determining of the washing path converter spray control S111-S112.

Additionally, the determining of the washing path converter spray control S211-S212 is the same as the determining of the washing path converter spray control S111-S112. The operating of the washing switch spray S213-S217 is the same as the operating of the washing switch spray S113-S117. The detecting of the engine start-up OFF S220 is the same as the detecting of the engine start-up OFF S120. The determining of the freezing temperature S221 may be performed before the adjusting of the washing path converter recovery S122-S123 to differ from the manner that the executing of the freezing-response washing control S100-S127 immediately enters into the adjusting of the washing path converter recovery S122-S123.

The adjusting of the washing path converter recovery S222-S223 is the same as the adjusting of the washing path converter recovery S122-S123. The operating of the washing switch recovery S224-S227 is the same as the operating of the washing switch recovery S124-S127. Accordingly, in the adjusting of the preemptive freezing-response washing S200-S227, the pump washer fluid device 10 of the washing system 1 may be operated under the external air condition that is less than the freezing temperature to prevent the washer fluid from remaining in the hose 12. Accordingly, unlike the executing of the freezing-response washing S100-S127 operating under the external air condition that is equal to or greater than the freezing temperature, the preemptive freezing-response washing S200-S227 may be operated under the external air condition that is less than the freezing temperature, but all of the operations and the effects thereof are the same.

Meanwhile, FIGS. 5 to 8A-8B illustrate examples in which a valve type dual pump washer fluid device 10-1 to which the washer pump 14 and the flow amount control valve 16 in FIGS. 4A-4B are applied is regarded as a basic structure, and by combining a spray pump 14-1, a recovery pump 14-2, the opening/closing pump 17, the spray opening/closing valve 17-1, the recovery opening/closing valve 17-2, and the valve motor 18, the pump washer fluid device 10 may include a motor type single pump washer fluid device 10-2 or a motor type dual pump washer fluid device 10-3. In particular, the washing controller 19 may include the washer pump 14, the spray pump 14-1, the recovery pump 14-2, and the valve motor 18 controlled by normal/reverse rotations as the control object for the spray and the recovery of the washer fluid. Since the controls of the normal/reverse rotations of the pump and the motor are the same, the procedures of the freezing-response washing control S100-S127 or the preemptive freezing-response washing control S200-S227 in FIG. 1 are the same.

FIG. 5 illustrates examples of various configurations of the washer pump 14 depending upon a type of the pump. For example, when the washer pump 14 is bi-directional rotation (normal/reverse rotations) pump, the pump may be configured to recover the residual washer fluid of the hose 12 by conversion of the rotation direction to be returned to the reservoir 11.

However, when the washer pump 14 is one-directional rotation (e.g., normal rotation or reverse rotation) pump, the washer pump 14 may be divided into the spray pump 14-1 and the recovery pump 14-2, and the hose 12 into a spray hose 12-1 connecting from the reservoir 11 to the nozzle 13, and a recovery hose 12-2 branched from the spray hose 12-1 and connected to the reservoir 11. The spray pump 14-1 may be mounted to the spray hose 12-1 at the location before the branching of the recovery hose 12-2, and the recovery pump 14-2 may be mounted to the recovery hose 12-2 to include two pumps and two hoses. Accordingly, the operation of the spray pump 14-1 pumps the washer fluid from the reservoir 11 to be transferred to the spray hose 12-1 and sprayed from the nozzle 13, while the operation of the recovery pump 14-2 pumps the residual washer fluid of the spray hose 12-1 after stop of the spray to return to the reservoir 11 via the recovery hose 12-2.

Figure 6:
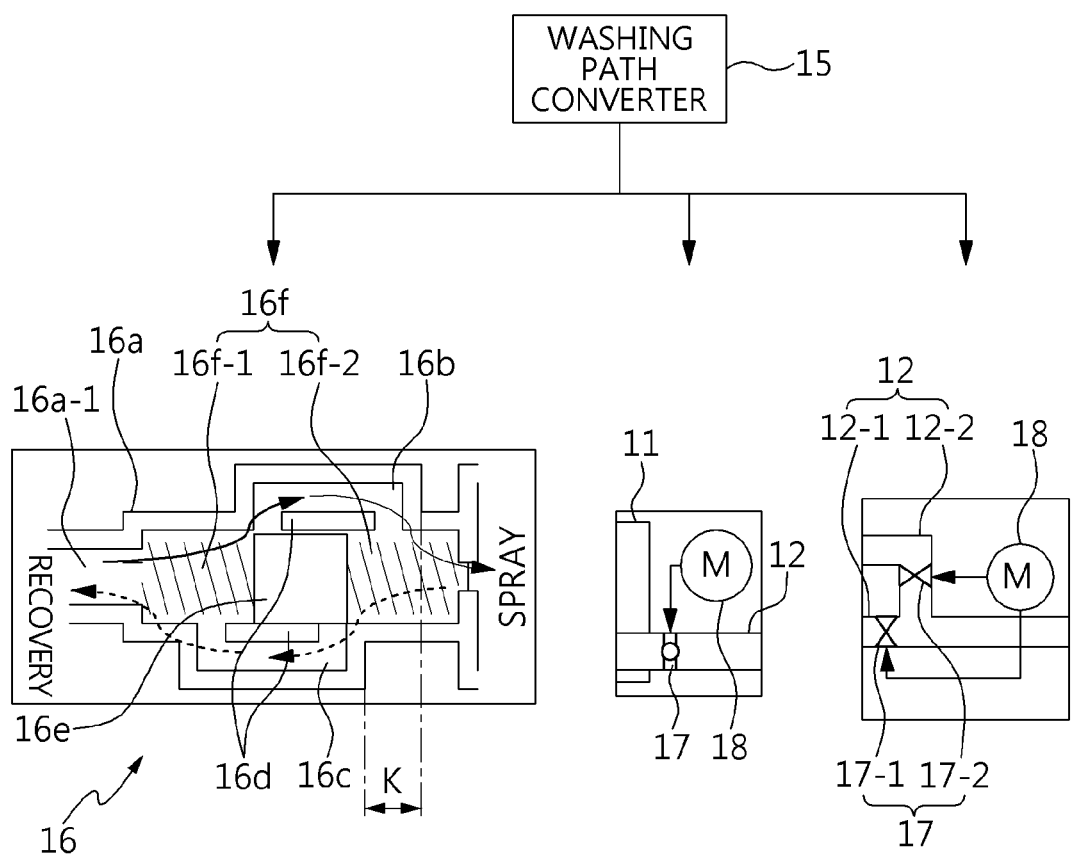
FIG. 6 is a configuration example of a washing path converter for the pump washer fluid device of the washing system in accordance with an exemplary embodiment of the present disclosure.

Meanwhile, FIG. 6 illustrates examples of various configurations of the washing path converter 15 depending upon a type of the valve. For example, the washing path converter 15 may include the mechanic type washing path converter 15 using the flow amount control valve 16, or the electric type washing path converter 15 using the opening/closing valve 17 and the valve motor 18.

The flow amount control valve 16 of the mechanic type washing path converter 15 may include the valve housing 16a, the dual chamber 16b, 16c, the plunger 16e, and the elastic member 16f. The valve housing 16a may form the washer fluid path 16a-1 of a bi-directional opening structure by the inner wall 16d, and form the movement path of the washer fluid connected with the hose 12 by the washer fluid path 16a-1.

Additionally, the dual chamber 16b, 16c may be divided into the spray chamber 16b from which the washer fluid injected through the inner wall 16d from the hose 12 to the nozzle 13 may be discharged from and thus, the valve housing 16a may have a first side connected with the washer fluid path 16a-1. The recovery chamber 16c from which the washer fluid injected through the inner wall 16d from the hose 12 to the reservoir 11 may be discharged from and thus, the valve housing 16a may have a second side connected with the washer fluid path 16a-1. Particularly, the location of the spray chamber 16b forms a front offset (K) further moving forward (i.e., the direction of the nozzle 13) of the recovery chamber 16c to allow spray flow (solid-line arrow) and recovery flow (dashed-line arrow) of the washer fluid through the forward/backward movements of the plunger 16e.

The plunger 16e moves back and forth (i.e., the length direction of the valve housing 16a) along the inner wall 16d in the direction of the washer fluid pressure when both sides thereof are supported by the elastic member 16f to close the path of the recovery chamber 16c when opening the path of the spray chamber 16b, or to close the path of the spray chamber 16b when opening the path of the recovery chamber 16c.

Further, the elastic member 16f may include a coil spring, and front/rear springs 16f-1, 16f-2 restrained by the inner wall 16d in the washer fluid path 16a-1 of the valve housing 16a. The front spring 16f-1 elastically supports the plunger 16e in the direction in which the plunger 16e receiving spring weight opens the path of the spray chamber 16b, and the back spring 16f-2 elastically supports the plunger 16e in the direction in which the plunger 16e receiving spring weight opens the path of the recovery chamber 16c. Accordingly, the front/rear springs 16f-1, 16f-2 elastically support both portions of the plunger 16e.

The opening/closing valve 17 and the valve motor 18 of the electric type washing path converter 15 will be described herein below in more detail. In particular, the electric type washing path converter 15 may include the opening/closing valve 17 and the valve motor 18. The opening/closing valve 17 may be mounted to the hose 12 connecting from the reservoir 11 to the nozzle 13, and may permit or block the movement of the washer fluid of the hose 12. The valve motor 18 may be configured to perform the bi-directional rotation (e.g., normal/reverse rotations) by a control of the washing controller 19. In particular, the washing controller 19 may be configured to open the opening/closing valve 17 based on the normal rotation to allow the washer fluid spray movement of the hose 12 to the nozzle 13 and close the opening/closing valve 17 based on the reverse rotation to block the washer fluid spray movement of the hose 12 to the nozzle 13.

Furthermore, the electric type washing path converter 15 may include the spray opening/closing valve 17-1, the recovery opening/closing valve 17-2, and the valve motor 18. The spray opening/closing valve 17-1 may be mounted to the spray hose 12-1 connecting from the reservoir 11 to the nozzle 13, and may permit or block the washer fluid spray movement of the hose 12 to the nozzle 13. The recovery opening/closing valve 17-2 may be branched from the spray hose 12-1 to be mounted to the recovery hose 12-2 connected to the reservoir 11, and may permit or block the washer fluid recovery movement of the hose 12 to the reservoir 11.

The valve motor 18 may be configured to perform the bi-directional rotation (normal/reverse rotations) by a control of the washing controller 19 to open or close the spray opening/closing valve 17-1 based on the directions of the normal/reverse rotations to allow or block the washer fluid spray movement, while opening or closing the recovery opening/closing valve 17-2 to allow or block the washer fluid recovery movement.

Meanwhile, FIGS. 7A-7B and 8A-B illustrate examples of various configurations of the pump washer fluid device 10 appropriately combining the washer pump 14, the spray pump 14-1, the recovery pump 14-2, the flow amount control valve 16, the opening/closing valve 17, the spray opening/closing valve 17-1, the recovery opening/closing valve 17-2, and the valve motor 18.

Figure 7A:
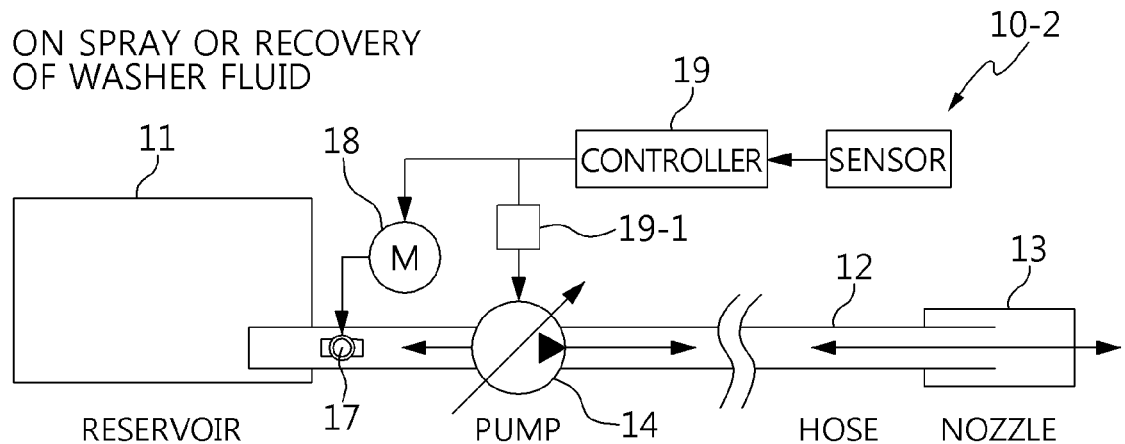
FIGS. 7A-7B are operation states of a motor type single pump washer fluid device in accordance with an exemplary embodiment of the present disclosure and FIGS. 8A-8B are operation states of a motor type dual pump washer fluid device in accordance with an exemplary embodiment of the present disclosure.
Figure 7B:
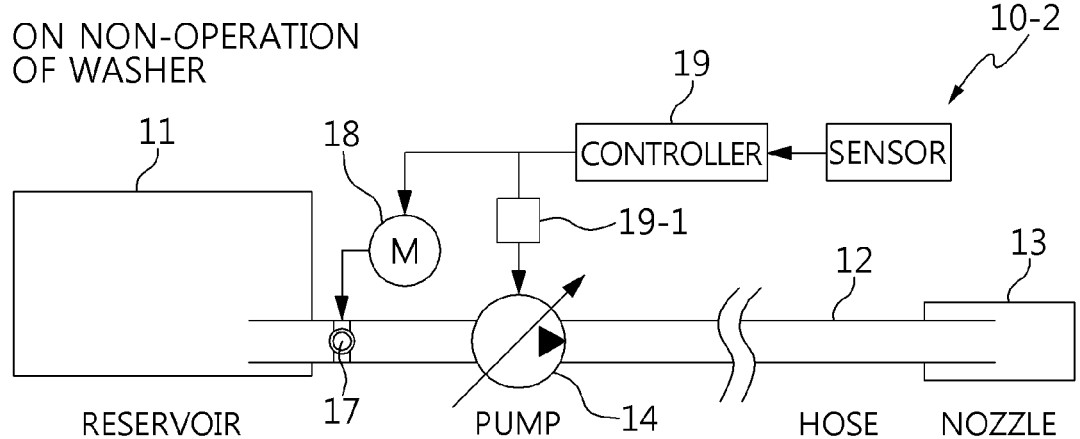

FIGS. 7A-7B illustrate examples of the pump washer fluid device 10 including the motor type single pump washer fluid device 10-2, and the motor type dual pump washer fluid device 10-3 applies the washer pump 14, the opening/closing valve 17, and the valve motor 18 to the hose 12 connecting the reservoir 11 and the nozzle 13.

Accordingly, the washing controller 19 may be configured to execute the bi-directional rotation (normal/reverse rotations) of the washer pump 14 via the washing switch 19-1 to form washer fluid spray flow for the nozzle 13 of the hose 12 and residual washer fluid recovery flow for the reservoir 11. Accordingly, the washing controller 19 may also be configured to adjust the bi-directional rotation (normal/reverse rotations) of the valve motor 18 together to open or close the opening/closing valve 17 based on the bi-directional rotation (normal/reverse rotations) of the washer pump 14.

Figure 8A:
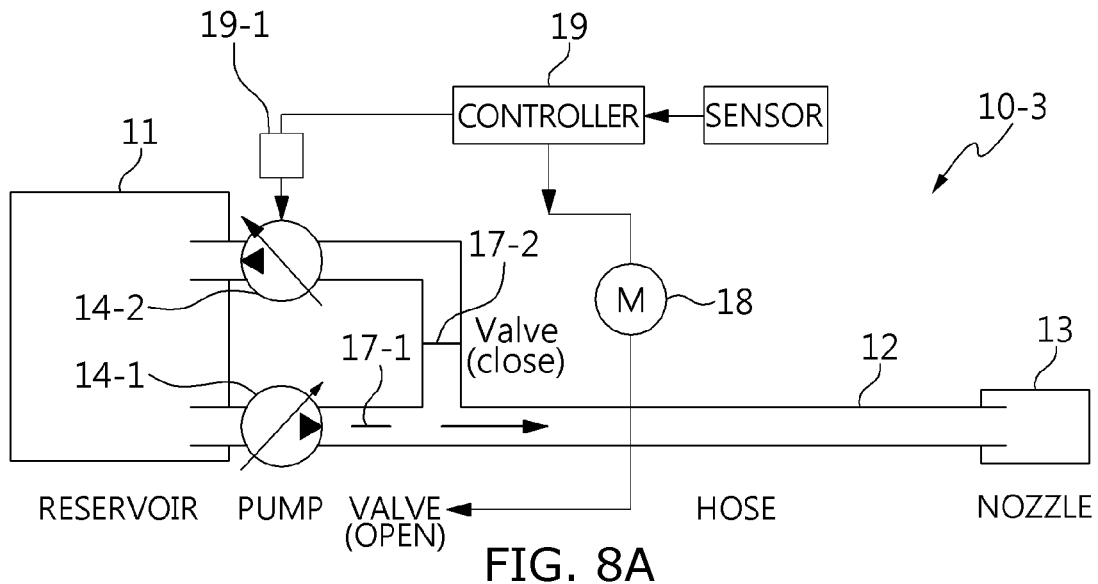
Figure 8B:
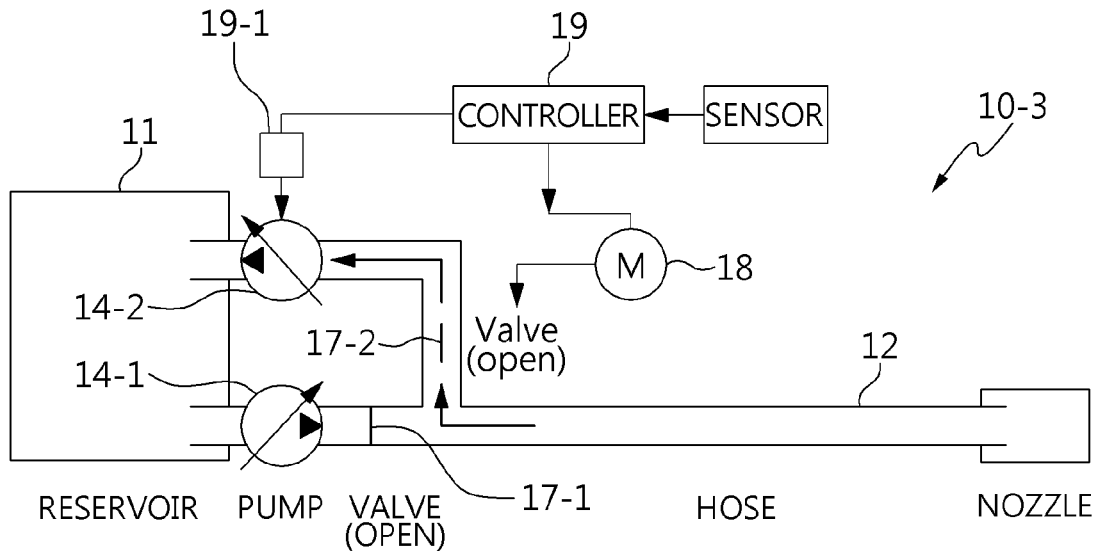

FIGS. 8A-8B illustrate example in which the pump washer fluid device 10 may include the motor type dual pump washer fluid device 10-3, and the motor type dual pump washer fluid device 10-3 applies the spray pump 14-1, the recovery pump 14-2, the spray opening/closing valve 17-1, the recovery opening/closing valve 17-2, and the valve motor 18 to the spray hose 12-1 and the recovery hose 12-2 that connect the reservoir 11 and the nozzle 13.

Accordingly, the washing controller 19 may be configured to execute one-directional rotation (e.g., normal rotation or reverse rotation) of the spray pump 14-1 and the recovery pump 14-2 via the washing switch 19-1 to form washer fluid spray flow for the nozzle 13 of the spray hose 12-1 and residual washer fluid recovery flow for the reservoir 11 of the recovery hose 12-2. For this purpose, the washing controller 19 may be configured to operate the valve motor 18 of the bi-directional rotation (e.g., normal/reverse rotations) together to open or close each of the opening/closing valve 17-1 and the recovery opening/closing valve 17-2 based on the one-directional rotation (e.g., normal rotation or reverse rotation) of the spray pump 14-1 and the recovery pump 14-2.

As described above, the washing system 1 in which the washer fluid freezing prevention control in accordance with the present exemplary embodiment is implemented forms the spray path of the hose 12 connecting from the reservoir 11 to the nozzle 13 and the recovery path of the hose 12 connecting from the nozzle 13 to the reservoir 11, and includes the pump washer fluid device 10 performing the freezing-response washing control and the preemptive freezing-response washing control that empty the residual washer fluid of the hose 12 based on washer fluid freezing temperature, thus more stably performing stable washing operation without spray failure due to washer fluid freezing in a cold temperature environment together with the minimization of the use of the heating consumption power.

While the present disclosure has been described with respect to the exemplary embodiments, it will be apparent to those skilled in the art that various changes and modifications may be made without departing from the spirit and scope of the disclosure as defined in the following claims.

What is claimed is:
1. A washing system, comprising:
   a pump washer fluid device including a washing path converter mounted to a hose connecting from a reservoir to a nozzle to form a movement path of washer fluid as a spray path to the nozzle and a recovery path to the reservoir; and
   a washing controller that forms the spray path or the recovery path by operating a washer pump,
   wherein the washing path converter is a flow amount control valve that forms the spray path and the recovery path, respectively, and the flow amount control valve includes:
   a valve housing;
   a spray chamber within the valve housing connected to the spray path by a plunger moving with washer fluid pressure of the washer pump; and
   a recovery chamber within the valve housing connected to the recovery path by the plunger moving with washer fluid suction force of the washer pump, wherein the spray chamber is located in the valve housing so as to form a front offset positioned forward of the recovery chamber toward the nozzle to allow spray flow and recovery flow of the washer fluid, wherein the valve housing includes an inner wall defining a bi-directional structure for the spray flow and the recovery flow of the washer fluid, and wherein the inner wall lies at least partially between the plunger and both of the spray chamber and the recovery chamber.

2. The washing system of claim 1, wherein the washer pump forms the spray path and the recovery path by bi-directional rotation, respectively.

3. The washing system of claim 1, wherein the washer pump is divided into a spray pump and a recovery pump of one-directional rotation, and the rotation of the spray pump forms the spray path, and the rotation of the recovery pump forms the recovery path, respectively.

4. The washing system of claim 3, wherein the spray pump is mounted to a spray hose connecting from the reservoir to the nozzle, the recovery pump is branched from the spray hose to be mounted to the recovery hose connected to the reservoir.

5. The washing system of claim 1, wherein the washing controller is linked with a washing control map provided with a table map that matches engine start-up ON/OFF signals and external air temperature of an external air temperature sensor with operation of the washing path converter.

6. The washing system of claim 1, wherein the pump washer fluid device includes a wiper device and a heating device together, the wiper device includes a wiper, a wiper motor, and a wiper controller, and the heating device includes a window glass heater, a wiper blade heater, and a washer fluid heater.

* * * * *